United States Patent [19]

Baer et al.

[11] Patent Number: 4,758,546

[45] Date of Patent: Jul. 19, 1988

[54] PREPARATION OF CATALYSTS, AND THEIR USE IN HYDROGENATION AND AMINATION REACTIONS

[75] Inventors: Karl Baer, Weinheim; Wolfgang Reiss, Ludwigshafen; Juergen Schossig, Mannheim; Herbert Toussaint, Frankenthal, all of Fed. Rep. of Germany

[73] Assignee: BASF Aktiengesellschaft, Fed. Rep. of Germany

[21] Appl. No.: 881,243

[22] Filed: Jul. 2, 1986

[30] Foreign Application Priority Data

Jul. 8, 1985 [DE] Fed. Rep. of Germany ....... 3524330

[51] Int. Cl.$^4$ ............................................. B01J 23/74
[52] U.S. Cl. .................................. 502/337; 502/325; 502/338
[58] Field of Search .................... 502/29, 30, 31, 33, 502/53, 325, 337, 338

[56] References Cited

U.S. PATENT DOCUMENTS

| | | | |
|---|---|---|---|
| 2,159,140 | 5/1939 | Eckell et al. | 502/29 |
| 2,388,959 | 11/1945 | Drew | 502/33 |
| 2,833,725 | 5/1958 | Owen et al. | 502/30 |
| 2,899,383 | 8/1959 | Hill | 502/30 |
| 3,062,680 | 11/1962 | Meddings et al. | 106/287.23 |
| 3,220,957 | 11/1965 | Hoff et al. | 502/30 |
| 3,324,195 | 6/1967 | Hwa et al. | 502/29 |
| 3,772,211 | 11/1973 | Mounce | 502/31 |
| 4,210,605 | 7/1980 | Hoshino et al. | 260/583 R |
| 4,234,462 | 11/1980 | Bondar et al. | 502/307 |

FOREIGN PATENT DOCUMENTS

| | | | |
|---|---|---|---|
| 2900384 | 1/1978 | Fed. Rep. of Germany | 502/307 |
| 1282347 | 12/1961 | France | 502/328 |
| 0692300 | 6/1953 | United Kingdom | 502/30 |

OTHER PUBLICATIONS

Ullmanns Encyklopaedie der technischen Chemie, 4th Ed., vol. 13, pp. 517–518.

*Primary Examiner*—Anthony McFarlane
*Attorney, Agent, or Firm*—Keil & Weinkauf

[57] ABSTRACT

Catalysts containing one of the metals iron, cobalt or nickel or a mixture of these are prepared by reduction of the particular catalyst intermediate with hydrogen at from 80° to 260° C. and under from 1 to 300 bar, in the liquid phase and in the presence of a redox system, and are used in the hydrogenation and amination of organic compounds.

2 Claims, No Drawings

PREPARATION OF CATALYSTS, AND THEIR USE IN HYDROGENATION AND AMINATION REACTIONS

The present invention relates to a novel process for the preparation of catalysts containing one of the metals iron, cobalt or nickel, or a mixture of these, by reduction of the particular catalyst intermediate with hydrogen in the liquid phase and in the presence of a redox system, and to their use in the hydrogenation and amination of organic compounds.

The preparation of active hydrogenation and amination catalysts based on one of the metals iron, cobalt and nickel or a mixture of these is usually carried out in a fixed bed by reduction of the particular metal oxide, or a mixture of metal oxides, with hydrogen in the gas phase at from 270° to 300° C. under from 1 to 150 bar.

This type of activation requires very expensive apparatus and is time-consuming. For example, nitrogen is first passed through the reaction tube filled with metal oxide, at a high flow rate (eg. 425 m³ per m³ of metal oxide). The nitrogen is circulated and has to be kept in the abovementioned temperature range, for example by means of electric preheaters. The hydrogen which is required for activation (reduction), and which has to be used in a very large excess particularly in the case of iron catalysts, must be metered very carefully since otherwise local overheating occurs, leading to sintering of the catalyst.

Moreover, the catalysts reduced in the gas phase frequently present difficulties during subsequent wetting with the liquid reagent. Since wetting generally does not take place uniformly, regions which are deficient in liquid are initially formed. As a result of delayed wetting of these regions, undesirable temperature increases may occur there at a later stage through evolution of heat of adsorption, possibly only when the hydrogenation or amination reaction is in progress.

German Laid-Open Application DOS No. 2,900,384 proposes reducing the catalyst intermediate with organic compounds (instead of hydrogen) as the reducing agent in an inert atmosphere. The term organic compounds embraces, inter alia, saturated and unsaturated hydrocarbons, alcohols, aldehydes, ketones, carboxylic acids and esters. In this process, the organic reducing agents are permitted to react with the metal oxides at from 200° to 800° C. The organic compounds are supposed to be oxidized to carbon dioxide and water. However, it is possible that the intermediates formed by partial oxidation may react further, in uncontrollable secondary reactions, to give sparingly volatile end products which partially deactivate the catalyst. Furthermore, sintering of the catalyst must be expected in this high temperature range (up to 800° C.).

It is an object of the present invention to provide a process which makes it possible to activate these catalysts in a simple manner and with less expensive apparatus.

We have found that this object is achieved, and that the preparation of catalysts containing one of the metals iron, cobalt or nickel, or a mixture of these, by reduction of the catalyst intermediate, containing one of the appropriate metal oxides or a mixture of these, with hydrogen can be effected advantageously if the reduction is carried out at from 80° to 260° C. and under from 1 to 300 bar, in the liquid phase and in the presence of a redox system.

The catalyst intermediates to be reduced, which are based on one of the oxides of iron, cobalt and nickel or a mixture of these, may be present either as supported catalysts or as catalysts without a carrier, and may contain further metals or their oxides.

Their preparation is known, and is described in, for example, Ullmanns Encyklopädie der technischen Chemie, 4th edition, volume 13, page 517 et seq.

According to the invention, the presence of a redox system is particularly important for carrying out the reduction with hydrogen.

A redox system is understood below as being a pair of substances (red, ox) where the substance (red) is reversibly oxidized to the substance (ox) by the metal oxide of the catalyst intermediate, dehydrogenation taking place, and water being formed from the hydrogen removed and the oxide oxygen. The dehydrogenated substance (ox) is then reversibly hydrogenated with hydrogen to give the starting material (red).

Such a pair of substances is used as a hydrogen carrier in the activation of the catalyst and is generally found to be unchanged after the activation process.

It is usually sufficient to begin the reduction process in the presence of the substance (red) alone, since (ox) is inevitably formed when dehydrogenation of (red) begins.

In principle, suitable redox systems are all organic compounds which can be dehydrogenated and hydrogenated reversibly, for example the following pairs of substances: hydroxy compounds/carbonyl compounds, amines/imines and saturated hydrocarbon compounds/unsaturated hydrocarbon compounds.

These redox systems may be present in a liquid or solid state, pairs of substances in the liquid state being preferred. Where solid redox systems are used, they are dissolved in a suitable solvent. Liquid redox systems may either be used as such or likewise dissolved in an additional liquid medium.

Suitable liquid redox systems are the pairs of substances comprising hydroxy compounds/carbonyl compounds, in particular primary alcohol/aldehyde and secondary alcohol/ketone. The formal interrelationship between both pairs of substances is shown in general form in equation (1):

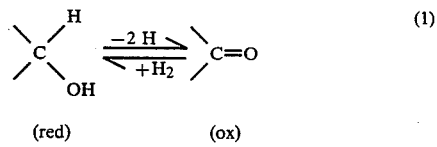

Particularly preferred pairs of substances are those which consist of straight-chain, branched or cycloaliphatic mono- or polyalcohols of not more than eight carbon atoms and the associated mono- or polyaldehydes or -ketones. In the case of polyalcohols, partial dehydrogenation is also possible, ie. not all of the hydroxyl groups are oxidized, so that components which simultaneously contain hydroxyl and carbonyl groups are also possible. For example, the following pairs of substances may be used: ethanol/acetaldehyde, isopropanol/acetone, butanol/butanal, cyclohexanol/cyclohexanone, ethane-1,2-diol/glyoxal (glycolic aldehyde), butane-1,4-diol /butane-1,4-dial(butan-1-al-4-ol), 2-ethoxyethanol/2-ethoxyethanal.

An example of a suitable solid redox system is the pair of substances hexane-1,6-diol/hexane-1,6-dial (hexan-1-al-6-ol).

It is advantageous if the liquid redox systems, as well as the solvents for solid redox systems, possess a certain degree of water solubility so that at least the water formed during the reduction can be dissolved. They should moreover have a positive heat of solution on the addition of water. Thus, the heat of solution can be utilized as additional energy for the reduction.

These preconditions are satisfied for the abovementioned preferred pairs of substances.

Examples of suitable solvents for solid redox systems are 1,4-dioxane, 1,2-dimethoxyethane and 1,2-diethoxyethane. In some cases, aqueous solutions may also be used.

The stated solvents may also be used as, for example, additional solvents for liquid redox systems.

Solutions of solid or liquid redox systems are advantageously employed in an amount of from 1 to 50, preferably from 10 to 30, % by weight, based on the solution.

The novel process is advantageously carried out by wetting the catalyst intermediate with the redox system (or its solution), generally in the presence of an inert gas, eg. nitrogen. When the desired reaction temperature has been reached, the inert gas is replaced with hydrogen, and the particular working pressure is established. The redox system is then replaced with the substrate to be hydrogenated (unless the two are identical) or with the substrate to be aminated.

According to the invention, the reduction is carried out in the liquid phase at from 80° to 260° C., preferably from 130° to 240° C., and under from 1 to 300, preferably from 150 to 250, bar. It may in principle also be carried out at above 260° C., but this is of no particular advantage.

Preferably, the temperature and pressure conditions are chosen so that the water formed during the reduction is also in the liquid state. As a result, the heat of condensation of the water can also be used as additional energy for the reduction.

In some cases, it may be advantageous to carry out the procedure in the presence of only small amounts of water. In this case, it is advisable to remove some of the reaction medium and replace it with anhydrous medium.

It is advantageous to carry out the process according to the invention using a high liquid loading (eg. from 30 to 60 m$^3$ per m$^2$ per h). The liquid loading is preferably set so that it is intermediate between the trickle range and pulsed flow.

The novel process can be carried out in fixed-bed reactors or fluidized-bed reactors. Furthermore, it can be effected continuously or batchwise, the former procedure being preferred.

The heat balance of the catalyst activation can be controlled particularly well by means of the novel process. This permits an optimum temperature program in the catalyst. By carrying out the procedure in the liquid phase, the temperature for the reduction process can be reduced.

Another advantage is that, in reactions whose end product is identical to a component of the redox system (for example, the hydrogenation of but-2-yn-1,4-diol to butane-1,4-diol), the desired reaction can be started immediately after the activation of the catalyst, without having to change the reaction medium.

The catalysts produced by the novel process possess higher activity and selectivity than those obtained in a conventional manner.

They may advantageously be used for the hydrogenation and amination of organic compounds, for example the hydrogenation of carbon-carbon multiple bonds (for example, alkenes and alkynes and their derivatives), of carbonyl compounds (for example, aldehydes, ketones, carboxylic acids and their derivatives) or of nitriles, or the amination of alcohols, aldehydes or ketones (reductive amination).

The Examples which follow illustrate the invention.

EXAMPLE 1

10 parts by volume of a nickel oxide/copper oxide/molybdenum oxide/alumina catalyst were introduced into a vertical high pressure reactor having a cylindrical reaction space. The metal oxide catalyst was in the form of cylindrical particles having a diameter of 6 mm and a height of 3 mm.

In the presence of nitrogen and under 20 bar, the catalyst was wet with n-butanol, and a liquid loading of 60 m$^3$ per m$^2$ per h was established by feeding in the liquid, which was circulated. Before the liquid was heated to 200° C., nitrogen was replaced with hydrogen, the flow rate for exit gas being 200 parts by volume (S.T.P.) per hour, and a pressure of 250 bar was established. After the metal oxide catalyst had been reduced continuously with hydrogen for 24 hours at 200° C. and a liquid loading of 60 m$^3$/m$^2$, the reactor content was cooled to about 120° C. Thereafter, the continuous introduction of 6 parts by volume/hour of an aqueous 50% strength but-2-yn-1,4-diol solution was begun. A liquid stream of 60 m$^3$ per m$^2$ per h was circulated, the reactor outlet temperature being 160° C. and the total pressure being 250 bar. At the same time, 2500 parts by volume (S.T.P.) of hydrogen were circulated. Analysis of the mixture discharged from the reactor showed that, under the stated hydrogenation conditions, butynediol had been hydrogenated completely to butane-1,4-diol.

Instead of n-butanol, butane-1,4-diol or isopropanol can be used equally effectively as a liquid redox system in the reduction of the above nickel oxide/copper oxide/molybdenum oxide/alumina catalyst.

EXAMPLE 2

15 parts by volume of a cobalt oxide/copper oxide catalyst in the form of 4×8 mm extrudates were introduced into a high pressure tube reactor having appropriate dimensions.

The catalyst was wet with 5-10 parts by volume/h of isopropanol in the presence of nitrogen (250 bar) in the course of 3 hours. The liquid loading was then increased to about 30 m$^3$ per m$^2$ per h (circulation method) and the mixture was heated to 100° C. At this temperature, nitrogen was replaced stepwise with hydrogen, the pressure being 250 bar and the exit gas flow rate being 500 parts by volume (S.T.P.)/h.

The temperature was then increased to 200° C. while the liquid loading and gas flow rate were kept constant.

Reduction of the catalyst was then carried out under the following conditions:

| | |
|---|---|
| fresh isopropanol feed: | 1 part by volume per hour |
| liquid recycled: | 30 m$^3$ per m$^2$ per h |
| exit gas flow rate: | 200 parts by volume (S.T.P.) per hour |
| temperature: | 200° C. |

-continued

| pressure: | 250 bar |
| reduction time: | not more than 96 h. |

After the reduction, the temperature was increased to no more than 230° C., and an adipic acid solution containing 15% by weight of adipic acid in hexanediol/water was hydrogenated to hexane-1,6-diol at the above liquid recycling rate, with 3000 parts by volume (S.T.P.)/h of recycled gas and under 250 bar, the product stream being increased from 10 to 40 parts by volume/h.

Excellent selectivity was achieved, and the spacetime yield was similar to or better than that obtained using catalysts reduced in the gas phase (reduction temperatures up to 310° C.).

Similar results are obtained when butanol, isobutanol or sec-butanol is used as the circulation liquid in the liquid-phase reduction.

We claim:

1. A process for the preparation of an active catalyst containing, iron, cobalt or nickel or mixtures thereof which consists essentially of: reducing the corresponding iron, cobalt or nickel oxide or mixture thereof to form the metal and water by contacting the metal oxide with a gas consisting essentially of hydrogen at a temperature of fom 80° to 260 ° C. and at a pressure of from 1 to 300 bar in liquid phase, wherein the liquid phase consists of or contains an organic compound which is capable of being reversibly hydrogenated or dehydrogenated, thus providing a redox system, wherein the redox system that is used comprises a pair of substances consisting of (a) a straight-chain, branched or cycloaliphatic mono- or polyalcohol of not more than 8 carbon atoms and (b) the corresponding mono- or polyaldehyde or ketone.

2. The process of claim 1 wherein the temperature and pressure conditions are chosen so that the water formed during the reduction is present in the liquid state.

* * * * *